J. E. NORWOOD.
PISTON RING.
APPLICATION FILED JUNE 21, 1917.
1,288,143.
Patented Dec. 17, 1918.
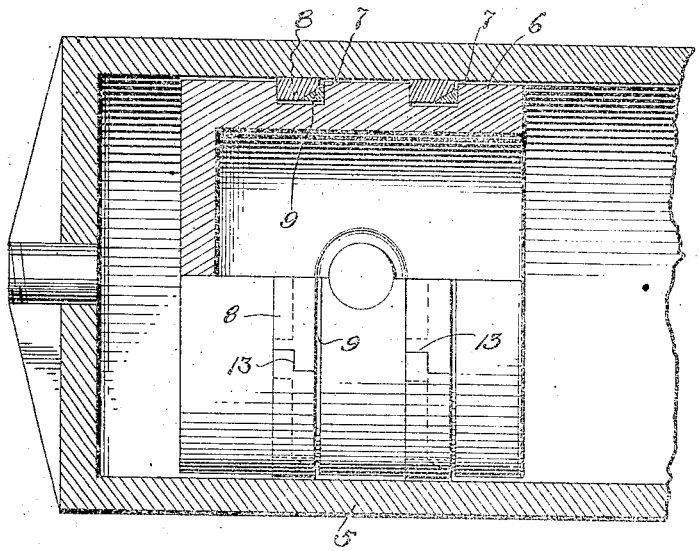
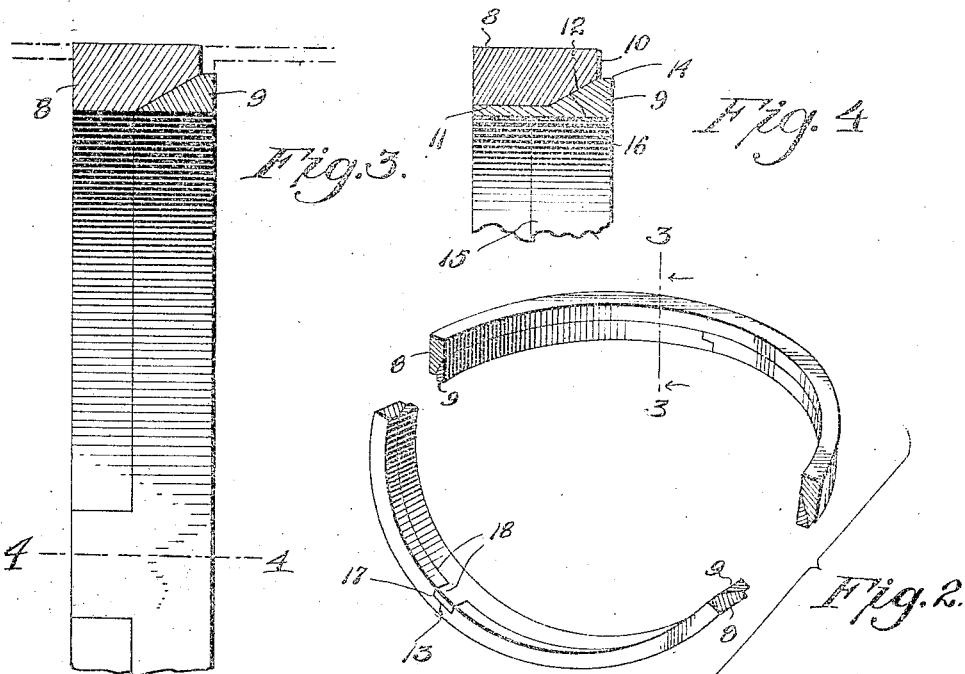
Inventor
J. E. Norwood

UNITED STATES PATENT OFFICE.

JOHN E. NORWOOD, OF BALTIMORE, MARYLAND.

PISTON-RING.

1,288,143.

Specification of Letters Patent.

Patented Dec. 17, 1918.

Application filed June 21, 1917. Serial No. 176,177.

*To all whom it may concern:*

Be it known that I, JOHN E. NORWOOD, a citizen of the United States, residing at Baltimore, State of Maryland, have invented certain new and useful Improvements in Piston-Rings; and I do hereby declare the following to be a full, clear, and exact description of the invention, such as will enable others skilled in the art to which it appertains to make and use the same.

This invention relates to packings for pistons and while it is designed primarily for use in connection with explosive engines, it will be understood that it may be used in connection with any mechanism in which a piston is to be fitted within a cylinder.

As is well known, the piston of an explosive engine is provided with any desired number of circumscribing grooves in each of which is disposed an open expansive ring.

It is found in practice that in the use of the ordinary ring, there is a loss of compression by reason of the gas escape not only through the joint of the ring ends but also through the groove of the piston along the sides and under the ring. It is therefore highly important that not only shall the ring snugly fit with its outer periphery against the inner wall of the cylinder, and that the ends of the ring be in close, gas-excluding contact, but also that the ring transversely fit the piston groove so as to be in gas-excluding contact with both side walls of the latter.

It is the object of the present invention to form a ring which may be fitted not only to the cylinder, but also to the piston groove so as to fit the latter transversely and likewise to provide a ring in which leakage through the joint of the ends, will be prevented.

In the drawings:—

Figure 1 is a section taken longitudinally through a portion of the cylinder of an explosive engine having therein a piston provided with rings, all embodying the present invention, the piston and rings being shown partly in section and partly in elevation.

Fig. 2 is a perspective view showing the composite ring cut in two with its resultant parts in different planes.

Fig. 3 is a section on line 3—3 of Fig. 2 but with the parts positioned to correspond to Fig. 1.

Fig. 4 is a section on line 4—4 of Fig. 3.

Referring to the drawing, there is shown a portion of the cylinder 5 of an explosive engine in which is disposed a piston 6 having the usual cross-sectionally rectangular circumscribing grooves 7 to receive each a packing ring.

The packing ring employed by me is a composite ring in that it includes two annular members 8 and 9.

The annular member 8, as illustrated, is when in use, of greater exterior diameter than the member 9 and has also a greater general width, the latter dimension being very nearly the width of the piston groove 7.

The member 8 is beveled from one of its side faces 10 to its inner periphery 11 to form the under-cut face 12 and its ends are provided with a lap joint 13.

The member 9 is beveled from its outer periphery 14 to its side 15 to form the slanting face 16 and the member 9 is disposed with its beveled portion within the inclosure of the member 8 so that its slanting face 16 contacts continuously with the undercut face 12 of the member 8. The cylindrical portion of the outer periphery of the member 9, which is the unbeveled portion, has only a very slight transverse extension and projects only slightly from the side face 10 of the member 8 and being in spaced relation inwardly of the outer periphery of the member 8, it forms a shelf for a purpose to be presently explained. It will be further noted that the outer diameter of the member 9 is less than the outer diameter of the piston 6 for a purpose that will also be presently explained.

To prevent angular movement of the members 8 and 9 with respect to each other, the member 8 at its lap joint 13 is transversely channeled in its inner periphery as shown at 17, and projecting laterally from the edge of the member 9 is a correspondingly shaped lug 18 which underlies the corresponding portion of the lap joint 13 and in connection with the adjacent portion of the member 9 completely covers the line of the lap joint at the inner periphery of the member 8, thus preventing leakage through the lap joint radially of the member 8.

In practice, the normal exterior diameter of the member 9 is greater than the major internal diameter of the member 8, and when these members are assembled and placed in the groove of the piston, the member 9 will expand and slide with its slanting face along the undercut face of the member 8 until it has had a lateral movement sufficient to contact with the corresponding face of the groove and force the member 8 against the opposite face of the groove. As the member 8 wears on the cylinder wall or the latter wears and the member 8 expands, radially, a corresponding expansion of the member 9 is permitted. As wear occurs between the ring members and the side walls of the piston groove, there is further lateral movement of the members with respect to each other, to compensate, as will be understood.

Thus not only is there provided a ring that automatically adjusts itself to fit the piston groove, but also the periphery of the inner member forms an oil shelf which receives and holds a body of oil in the downward movement of the piston as the oil is scraped from the cylinder wall, insuring proper lubrication between the member 8 and the cylinder, the positioning of this shelf below the surface of the piston resulting in a pocketed shelf which insures a body of oil in such position as to oil-pack the contacting faces of the members 8 and 9 with a resultant efficiency in the prevention of gas leakage therebetween. It will be further noted that while the extension 18 covers the lap joint of the member 8, the under-cut portion of the member 8 covers the lap joint of the member 9 excepting at the unbeveled portion of the periphery of the member 9, where the oil on the shelf effectively prevents leakage.

What is claimed is:

A composite piston ring comprising an outer member having jointed ends and a portion of its inner face beveled from one side to its inner periphery, an inner member having jointed ends and beveled from a side face to its outer periphery, the members being disposed with the slanting faces resultant from their bevels in mutual sliding contact and with the outer member covering the joints of the ends of the corresponding portion of the inner member, the inner member having a lateral extension covering the corresponding portions of the joints of the ends of the outer member.

In testimony whereof, I affix my signature in the presence of two witnesses.

JOHN E. NORWOOD.

Witnesses:
LEWIS H. MILLER,
WILLIAM E. SCHUL.